United States Patent [19]

Morgan

[11] Patent Number: 5,340,256
[45] Date of Patent: Aug. 23, 1994

[54] SECURITY NUTS

[75] Inventor: Jack L. Morgan, Halesowen, United Kingdom

[73] Assignee: Kinnings Marlow Limited, Wednesbury, United Kingdom

[21] Appl. No.: 100,776

[22] Filed: Aug. 2, 1993

[30] Foreign Application Priority Data

Aug. 14, 1992 [GB] United Kingdom ............... 9217268.3

[51] Int. Cl.$^5$ .................... F16B 23/00; F16B 35/06
[52] U.S. Cl. .................... 411/405; 411/427; 411/911
[58] Field of Search ............... 411/403, 404, 405, 407, 411/410, 427, 910, 911

[56] References Cited

U.S. PATENT DOCUMENTS

| | | |
|---|---|---|
| 1,506,500 | 8/1924 | Ripamonti et al. |
| 3,134,292 | 5/1964 | Walton .................... 411/919 X |
| 3,302,672 | 2/1967 | Walton .................... 411/911 X |
| 4,429,599 | 2/1984 | La Sante, Sr. .................... 411/911 X |
| 5,033,501 | 7/1991 | Stehling .................... 411/911 X |

FOREIGN PATENT DOCUMENTS

| | | |
|---|---|---|
| 0013274 | 7/1980 | European Pat. Off. |
| 466526 | 5/1914 | France . |
| 1232468 | 10/1960 | France . |
| 1424148 | 11/1965 | France . |
| 2338628 | 8/1977 | France .................... 411/405 |
| 1223900 | 3/1971 | United Kingdom . |

Primary Examiner—Neill R. Wilson
Attorney, Agent, or Firm—Marshall, O'Toole, Gerstein, Murray & Borun

[57] ABSTRACT

A security nut, which can be tightened on to a bolt but not slackened, has a body which is dome shaped and through which a threaded bore passes. The external dome-shaped surface of the body is provided with grooves which have diverging walls which can be engaged by driving faces of a socket tool to tighten the nut but not to slacken it. The dome-shape of the body makes it virtually impossible to grip it to slacken the nut.

9 Claims, 1 Drawing Sheet

SECURITY NUTS

BACKGROUND OF THE INVENTION

1. Field of the Invention

This invention relates to security nuts.

An example of the use of a security nut is in the assembly of security fencing.

2. Description of the related art including information disclosed under 37 CFR 1.97–1.99

In security fencing it is known to use a bolt with a head having a groove in its underside to engage with a fencing post and a nut which comprises a normal hexagonal part and a round dome-shaped body which is attached to the hexagonal part by a neck. The nut is threaded onto the bolt and is tightened by the hexagonal part and when a pre-determined torque is obtained the neck breaks off leaving the dome-shaped part on the bolt. It is almost impossible to remove this part and therefore the arrangement is secure.

However there are three disadvantages of this prior arrangement. Firstly it is usual for the nut and bolt to be galvanized and when the hexagonal part of the nut breaks off the dome-shaped part this leaves a face which has not been galvanized and which may go rusty.

Secondly, sometimes the pre-determined torque to separate the two parts of the nut occurs before the nut is fully tightened and then the dome-shaped part of the nut is left on the bolt in a slack condition which probably means that the bolt has to be cut off and a new nut and bolt assembly inserted.

Thirdly, since the hexagonal part of the nut is scrapped, the nut is expensive.

It is also known, e.g. from European Patent Application No 0 013 274, to have a cylindrical nut with formations on its end face which allow the nut to be tightened with a tool but not slackened. Disadvantages of this construction are firstly, that it is difficult to align the tightening tool with the nut and, secondly, due to the cylindrical shape of the nut, it is possible to rotate and slacken the nut with a pair of grips which can engage the cylindrical surface. The nut therefore is not secure.

Amongst the art cited against European patent Application No 0 013 274 is French Patent No 1,232,468 which discloses a bolt with a cylindrical head having formations on its end which may be engaged with a socket to tighten the bolt but which prevent the bolt being slackened. This overcomes the first of the disadvantages of European Patent Application No 0 013 274 but not the second. The cylindrical head may be engaged with grips and slackened so that it is not secure.

It is an object of the present invention to provide a security nut which overcomes the above disadvantages.

SUMMARY OF THE INVENTION

According to the invention we provide a security nut comprising a body having opposite ends of greater and lesser diameter respectively and an external surface of generally domed shape between said ends, a threaded bore extending between said ends, and a plurality of grooves in said domed surface and extending between said ends, one wall of each groove lying in a plane generally radial to the longitudinal axis of the bore and the other wall diverging, in a direction away from the base of the groove, away from the one wall, the groove walls being so arranged that the nut can be tightened onto a male threaded member received in the bore by torque applied to the nut by engagement of said one walls by a driving faces on a suitable tool but so that said inclination of said other walls prevents torque being applied to the nut by engagement of said other walls to allow the nut to be slackened from said male threaded member.

With an appropriate tool having a recess to receive the nut and with driving faces to engage the one walls of the grooves the nut can be tightened on to a bolt. The tightening does not damage any galvanizing there may be on the nut and there is no danger of the nut breaking partly tightened as in the prior art referred to above. Because of the inclination of the other walls of the grooves it is impossible to engage these with any tool to slacken the nut. Also because of the domed shape of the nut it is virtually impossible to get a sufficient grip on the nut with grips to enable the nut to be slackened off the bolt.

The nut therefore is secure, is easily applied and is considerably cheaper than the two-part nut described above.

Preferably the diameter of said end of greater diameter is between one and one half and three times, preferably twice, the nominal diameter of the thread in the bore. Preferably the domed surface is part-spherical, the spherical radius being approximately equal to the nominal diameter of the thread in the bore.

Preferably the perpendicular distance between the ends of greater and lesser diameter is between about 0.8 and 0.9 times the nominal diameter of the thread in the bore.

Said ends of greater and lesser diameter are preferably planar. Preferably the base of each groove is inclined at an angle of 28° with respect to an imaginary line passing through said base parallel to the longitudinal axis of the thread.

The invention also includes a nut in combination with a tool having a recess to receive the nut, the recess having driving faces to engage said one walls of the grooves.

BRIEF DESCRIPTION OF THE DRAWING

The invention will now be described in detail by way of example with reference to the accompanying drawings in which.

DESCRIPTION OF THE PREFERRED EMBODIMENT

Figure 1:
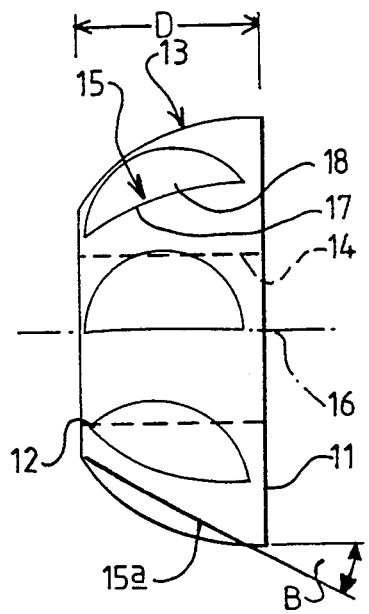
FIG. 1 is a side elevation of a nut constituting an embodiment of the invention.
Figure 2:
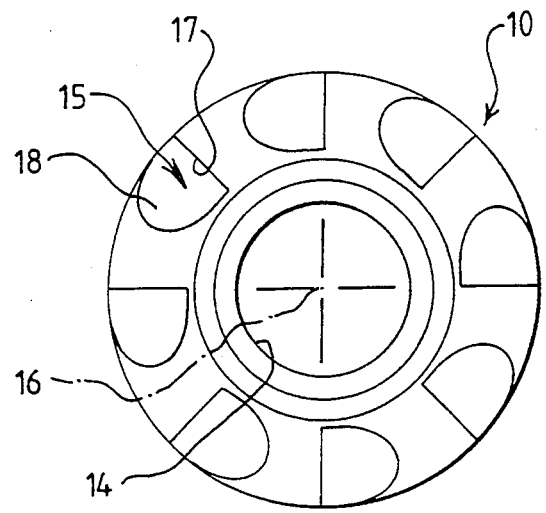
FIG. 2 is a plan view of the nut of FIG. 1.

Referring now to FIGS. 1 and 2, the nut there shown comprises a body 10 having opposite planar ends 11 and 12 of greater and lesser diameter respectively. The external surface 13 of the nut between the ends 11 and 12 is dome-shaped and is part-spherical. The nut has a central threaded bore 14.

The spherical radius of the surface 13 is preferably approximately equal to the nominal diameter of the thread in the bore 14. The distance D between the ends 11 and 12 is between about 0.8 and 0.9 times the nominal diameter of the thread in the bore 14. The diameter of the end 11 is preferably twice the nominal diameter of said thread. The diameter of the end 11 may be between one and one half and three times the nominal diameter of the thread.

The external surface of the body is formed with a plurality of grooves, which extends substantially between the ends 11 and 12. In the embodiment shown, there are eight grooves. One of the grooves is indicated at 15. All the grooves are similar and are equiangularly spaced around the longitudinal axis 16 of the bore. Each groove has a first wall 17 which lies in a plane generally radial to the axis 16 as is clearly shown in FIG. 2. The other wall, 18 diverges from the wall 17 in a direction away from the base 15a of the groove. As will be seen in FIG. 1, the base 15a of each groove lies substantially on a chord of the part-spherical surface and makes an angle B of 28° with an imaginary line passing through the base and being parallel to the axis 16.

The arrangement is such that the nut can be rotated by a force applied to the walls 17 to tighten the nut on a male threaded member received in the bore 14 but the divergence of the walls 18 prevents a torque being applied to the nut by engagement of these walls to slacken the nut. Any such torque applied by a tool causes the tool to cam out.

It will thus be seen that the nut may be used where security is required since it may be tightened up onto a bolt but not slackened.

Figure 3:
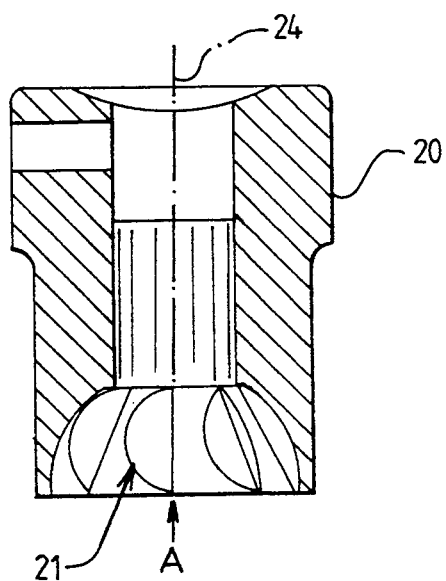
FIG. 3 is a section through a tool for tightening a nut embodying the invention.
Figure 4:
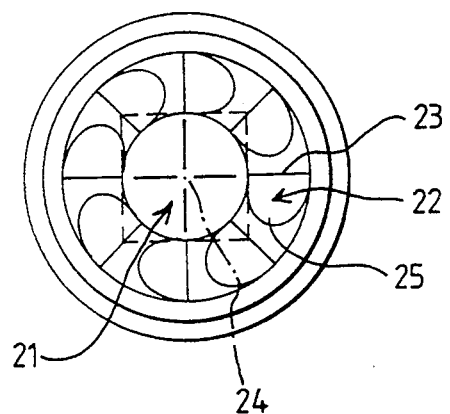
FIG. 4 is the view in the direction of the arrow A in FIG. 3.

The nut may be tightened using the tool shown in FIGS. 3 and 4. The tool is in the form of a tubular socket member 20 engageable by a driving bar or the like. The end of the socket member is provided with a recess 21 and in the recess are formed eight grooves 22 which are the mirror images of the grooves in the nut. Thus the grooves have walls 23 which lie in planes radial to the axis 24 and divergent walls 25.

The nut is driven by placing the recess in the socket member 20 of FIGS. 3 and 4 over the nut so that the walls 23 of the socket, which constitute driving faces, engage the faces 17 of the nut and then turning the nut by rotating the socket member to tighten the nut. If the direction of movement of the socket member is reversed the nut will cam out and can not be slackened.

The nuts described above may be made of e.g. steel, non-ferrous metal, or plastic and if made of steel may be galvanized.

It will be seen that the invention provides a nut having a security feature in that it can be tightened by a tool but not slackened. The dome shape of the nut effectively prevents the nut being gripped by grips or similar and again prevents it being slackened. The nuts of the invention avoid the disadvantages of the prior art in that if they are galvanized no damage is done to the galvanizing during tightening. Moreover the possible disadvantage of the nut breaking in two when only half-tight which was present in the prior art is avoided.

I claim:

1. A security nut comprising a body having opposite ends of greater and lesser diameter respectively and an external surface of generally domed shape between said ends, a threaded bore extending between said ends, and a plurality of grooves in said domed surface and extending substantially between said ends, each groove having a base and two walls, one of said walls of each groove lying in a plane generally radial to the longitudinal axis of the bore and the other of said walls diverging, in a direction away from the base of the groove, from the one wall, the groove walls being so arranged that the nut can be rotated in a tightening sense with respect to the hand of the thread in the bore by torque applied to the nut by engagement of said one walls by driving faces on a suitable tool but so that said inclination of said other walls prevents torque being applied to the nut by engagement of said other walls to rotate the nut in a slackening sense with respect to the hand of the thread in the bore.

2. A nut according to claim 1 in which the diameter of said end of greater diameter is between one and a half and three times the nominal diameter of the thread in the bore.

3. A nut according to claim 2 in which the diameter of said end of greater diameter is approximately twice the nominal diameter of said thread.

4. A nut according to claim 1, in which the domed surface is part-spherical, the spherical radius being approximately equal to the nominal diameter of the thread in the bore.

5. A nut according to claim 1, in which the perpendicular distance between said ends of greater and lesser diameter is between about 0.8 and 0.9 times the nominal diameter of the thread in the bore or on said shank.

6. A nut according to claim 1, in which said ends of greater and lesser diameter are planar.

7. A nut according to claim 1, in which the base of each groove makes an angle of 28° with an imaginary line passing through the base and which is parallel to the longitudinal axis of the thread 8. A security nut comprising a body having opposite planar ends of greater and lesser diameter respectively and an external surface of part-spherical shape between said ends, a threaded bore extending between said ends, the spherical radius of said external surface being approximately equal to the nominal diameter of the thread in said bore, and a plurality of grooves in said external surface and extending substantially between said ends, each groove having a base and two walls, one of said walls of each groove lying in a plane generally radial to the longitudinal axis of the bore and the other of said walls diverging, in a direction away from the base of the groove, from the one wall, the groove walls being so arranged that the nut can be rotated in a tightening sense with respect to the hand of the thread in said bore by torque applied to the nut by engagement of said one walls by driving faces on a suitable tool but so that said inclination of said other walls prevents torque being applied to the nut by engagement of said other walls to rotate the nut in a slackening sense with respect to the hand of the thread in said bore.

9. The combination of a nut and a driving tool, the nut comprising a body having opposite ends of greater and lesser diameter respectively and an external surface of generally domed shape between said ends, a threaded bore extending between said ends, and a plurality of grooves in said domed surface and extending substantially between said ends, each groove having a base and two walls, one of said walls of each groove lying in a plane generally radial to the longitudinal axis of the bore and the other said wall diverging, in a direction from the base of the groove, from the one wall; the tool having a recess to receive said nut, the recess having driving faces to engage said one walls of the grooves, the groove walls being so arranged that the nut can be rotated in a tightening sense with respect to the hand of the thread in sad bore by torque applied to the nut by engagement of said one walls by said driving faces but so that said inclination of said other walls prevents torque being applied to the nut by engagement of said other walls by the tool to allow the nut to be rotated in a slackening sense with respect to the hand of the thread in said bore.

* * * * *